US012546145B2

(12) United States Patent
Mensch et al.

(10) Patent No.: US 12,546,145 B2
(45) Date of Patent: Feb. 10, 2026

(54) ELECTRONIC SENSOR MODULE AND HANDLE MODULE

(71) Applicant: WITTE Automotive GmbH, Velbert (DE)

(72) Inventors: Reinaldo Mensch, Wuppertal (DE); Karsten Steinhauer, Essen (DE)

(73) Assignee: Witte Automotive GmbH, Velbert (DE)

( * ) Notice: Subject to any disclaimer, the term of this patent is extended or adjusted under 35 U.S.C. 154(b) by 61 days.

(21) Appl. No.: 18/437,310

(22) Filed: Feb. 9, 2024

(65) Prior Publication Data

US 2024/0271469 A1 Aug. 15, 2024

(30) Foreign Application Priority Data

Feb. 10, 2023 (DE) ..................... 10 2023 201 129.8

(51) Int. Cl.
*E05B 81/76* (2014.01)
*G01D 5/24* (2006.01)

(52) U.S. Cl.
CPC ............... *E05B 81/77* (2013.01); *G01D 5/24* (2013.01)

(58) Field of Classification Search
CPC .......... E05B 81/77; E05B 81/76; E05B 85/10; G01D 5/24; G01D 5/2403; G01D 5/2405
USPC ........................................................... 70/263
See application file for complete search history.

(56) References Cited

U.S. PATENT DOCUMENTS 6,696,652 B1 * 2/2004 Spies ...................... E05B 83/16 200/333
6,768,413 B1 * 7/2004 Kemmann ......... G07C 9/00309 70/237
6,933,831 B2 * 8/2005 Ieda ...................... B60R 25/246 340/5.72
7,019,233 B2 * 3/2006 Spies ..................... H01H 21/10 200/332.2
7,057,124 B2 * 6/2006 Leda ...................... E05B 81/76 200/520

(Continued)

FOREIGN PATENT DOCUMENTS

DE 102018125419 A1 * 4/2020

OTHER PUBLICATIONS

German Patent and Trademark Office, Office Action in Application No. DE 10 2023 201 129.8, Dated Oct. 26, 2023, 7 pages.

*Primary Examiner* — Nathan Cumar

(74) *Attorney, Agent, or Firm* — Marshall & Melhorn, LLC

(57) ABSTRACT

An electronic sensor module for a handle may have a sensor unit having a movable sensor element and a fixed sensor element which is arranged opposite the movable sensor element. The module may also have an electronics unit which is electrically connected to at least one of the sensor elements for triggering a switching signal. The movable sensor element and the fixed sensor element are arranged relative to one another such that, in the event of an actuating force acting upon the sensor module, the movable sensor element is displaceable relative to the fixed sensor element. An actuating element is provided which is arranged such that it transmits the actuating force directly to the movable sensor element so that an actuating path of the actuating element is convertible into a sensor path of the movable sensor element. A handle module with the module is also provided.

13 Claims, 1 Drawing Sheet

(56) References Cited

U.S. PATENT DOCUMENTS

| | | | | |
|---|---|---|---|---|
| 7,078,640 | B2 * | 7/2006 | Miyake | H01H 21/04 200/341 |
| 7,140,653 | B2 * | 11/2006 | Kobayashi | E05B 85/16 292/336.3 |
| 7,173,346 | B2 * | 2/2007 | Aiyama | E05B 81/78 307/9.1 |
| 7,199,317 | B2 * | 4/2007 | Leda | E05B 81/78 200/600 |
| 7,210,715 | B2 * | 5/2007 | Kobayashi | E05B 81/76 70/237 |
| 7,273,991 | B2 * | 9/2007 | Korultay | E05B 81/76 200/520 |
| 7,284,776 | B2 * | 10/2007 | Cummins | E05B 85/16 292/336.3 |
| 7,375,299 | B1 * | 5/2008 | Pudney | E05B 81/78 200/61.62 |
| 7,984,937 | B2 * | 7/2011 | Tanimoto | E05B 81/78 292/336.3 |
| 8,469,412 | B2 * | 6/2013 | Mizushima | E05B 81/78 292/336.3 |
| 8,701,353 | B2 * | 4/2014 | Patel | E05B 85/103 292/201 |
| 8,833,813 | B2 * | 9/2014 | Muller | E05B 85/107 292/336.3 |
| 10,253,530 | B2 * | 4/2019 | Savant | E05B 85/14 |
| 10,385,594 | B2 * | 8/2019 | Magner | E05B 85/10 |
| 10,422,166 | B2 * | 9/2019 | Papanikolaou | H02N 2/186 |
| 2020/0362604 | A1 * | 11/2020 | Jarnicki | E05B 81/20 |

* cited by examiner

ELECTRONIC SENSOR MODULE AND HANDLE MODULE

FIELD

The invention relates to an electronic sensor module and to a handle module, in particular, for a handle, such as an outside handle, for example, for a movable vehicle element such as a sliding door, a tailgate, or an engine hood/front hood of a vehicle.

BACKGROUND

Handle modules are known, for example, on vehicle doors, tailgates, or engine hoods. These are usually provided with a handle element which may be pivoted outwards in order to be able to open the vehicle door, the tailgate, or the engine hood. Handle modules can comprise electronic sensor modules for opening a lock on the door.

The invention is based upon the object of specifying a sensor module which is improved over the prior art, has a compact structure, and has greater triggering sensitivity. Furthermore, a handle module with such an improved sensor module is presented.

With regard to the electronic sensor module, and with regard to the handle module, the objects are achieved according to the invention by the features specified in claims disclosed herein.

Further developments of the invention are the subject matter of the dependent claims.

SUMMARY

The electronic sensor module according to the invention, in particular, for a handle, such as a door handle, comprises at least one sensor unit having a movable sensor element and a fixed sensor element which is arranged opposite the movable sensor element, and an electronics unit which is electrically connected to the sensor elements for triggering a switching signal, wherein the movable sensor element and the fixed sensor element are arranged in relation to one another such that, in the event of an actuating force acting upon the sensor module, the movable sensor element can be displaced relative to the fixed sensor element, wherein an actuating element is provided which is arranged such that it transmits the actuating force directly to the movable sensor element so that an actuating path of the actuating element can be converted into a sensor path of the movable sensor element.

Such sensor elements are known in which a support structure has to be locally deformed by the actuating force so that the support structure acts upon the movable sensor element. In contrast, it is now proposed that the actuating element transmit the actuating force directly to the movable sensor element. The advantages achieved with the invention consist in particular in the measuring sensitivity of the sensor unit (also called a sensor) being able to be increased. In addition, the invention enables the same measurement sensitivities, even when there are sensor materials of different stiffness, by a change or adjustment of the transmission ratio, in particular, a lever ratio. Accordingly, the electronic sensor module is suitable for various applications.

A further development provides that an actuating movement of the actuating element resulting from the actuating force be translated into a sensor movement of the movable sensor element in a predetermined transmission ratio. For example, a predetermined transmission ratio of 1:4 or 1:2 can be set. In particular, the sensor module according to the invention can be easily produced with different transmission ratios, so that the sensor module can be used for different applications.

In order to adjust the transmission ratio, the movable sensor element can be designed as a lever, in particular, a one-sided lever or a two-sided lever. In particular, the movable sensor element can be arranged at a predetermined angle to the fixed sensor element. For example, the movable sensor element is arranged and held at such an angle to the fixed sensor element that a transmission ratio of the actuating movement of the actuating element to the sensor movement (also adjusting movement) of the movable sensor element of 1:4 or 1:2 is set. This allows a compact design of the sensor module and small actuation strokes. In addition, the actuation forces can be set; in particular, threshold values can be specified.

For example, the movable sensor element can be pivotably articulated, on the one hand, to the support plate. On the other hand, a free lever end of the movable sensor element is arranged at a predetermined slope at a distance from the fixed sensor element and covers it. The predetermined slope corresponds to the predetermined angle of the movable sensor element relative to the fixed sensor element.

In one possible embodiment, an actuating element can be provided which is arranged such that, and which interacts with the movable sensor element such that, a predetermined actuating path of the actuating element can be converted into a sensor path of the movable sensor element, in particular, with the predetermined transmission ratio. For example, such a transmission ratio can be set that a short actuating path is converted to a long sensor path. This enables reliable sensor detection, and the sensor sensitivity is easily increased.

The actuating element can, for example, engage at a point of engagement on the movable sensor element for the actuation thereof. The transmission ratio is determined by the length ratio of two lever arms: by a first lever arm which extends between the point of engagement of the actuating element and the axis of rotation of the movable sensor element, and a second lever arm which extends between the end point of the movable sensor element and the axis of rotation. The transmission ratio can therefore be easily varied in that the point of engagement of the actuating element is shifted so that the length of the first lever arm changes, while the second lever arm remains unchanged. If the first lever arm is shortened in this way, the transmission ratio increases. If, on the other hand, the first lever arm is lengthened, the transmission ratio is reduced.

In addition, the sensor unit can be surrounded at least in some regions by a potting material. Thereby, the sensor unit itself is protected from external influences such as moisture, mechanical loads, dirt, water, and rain.

In one possible embodiment, the sensor unit is designed as a force sensor, in particular, a force-controlled, capacitive or inductive sensor, for performing a switching function, such as, for example, unlocking a door lock and opening a door. In particular, the sensor unit is designed as a so-called MOC module (=metal-over-cap module), in which the metallic sensor elements located on the inside are encapsulated from the outside.

In a further development, the movable sensor element is designed as an elastic trigger element. This allows, in a simple manner, for a manually force-controlled pressure switch having a resetting function. In addition, the movable sensor element can be interposed as an electronic sensor element, in particular, a capacitive sensor electrode. As a result, the movable sensor element can also be used to detect an approach of an object and thus serve as an approach sensor.

For example, the actuating element, e.g., a separate actuating tappet or actuating pin, can engage with the movable sensor element when it is actuated in the region of the articulation of the movable sensor element, or enter into further engagement therewith and move the movable sensor element away from the fixed sensor element or towards the fixed sensor element. A separate actuating tappet or actuating pin offers the advantage of being able to be calibrated easily and very precisely. This separate actuating tappet or actuating pin can, for example, itself be the actuating element, or can be connected to an actuating plate or the like to form an actuating element.

Another embodiment provides that the actuation element comprise a pressure transmission element which protrudes inwardly in the direction of the sensor unit. For example, the actuation element comprises an inwardly protruding actuating tappet or actuating pin which can be moved in the pressure direction to actuate the movable sensor element.

An actuating element or an actuating tappet or actuating pin can advantageously be made of a plastic, for example. To achieve different sensitivity, the electronic sensor module can be adapted by selecting the hardness and the dimensions of the actuating element or actuating tappet or actuating pin. In particular, an actuating tappet or actuating pin can have a rounded end in order to keep the friction between the actuating tappet or actuating pin and the movable sensor element low. A rounded tappet can offer advantages for eccentric actuation, even with regard to tolerances.

It can, for example, be designed integrally with an actuating surface on which a user applies an actuating force. Such an actuating surface can be formed, for example, by a rear side of a handle module or by an actuating plate arranged on the rear side of the handle module, into which the sensor module is installed so that a slight deformation of the actuating surface causes an actuating movement of the actuating tappet or actuating pin arranged thereon, which in turn acts directly upon the movable sensor element and thus exerts an actuating force on the movable sensor element. An integral design of an actuating element with an actuating surface and an actuating tappet or actuating pin has the advantage that an independent or separate bearing is unnecessary for the actuating tappet or actuating pin.

In particular, the actuation element can be actuated such that it can be moved in the pressure direction through a through-opening to the movable sensor element, such as a trigger element for example, and moves this in the direction of the fixed sensor element or away from this fixed sensor element upon further pressure actuation. This reduces or increases the distance between the movable sensor element, e.g., a trigger element, and the fixed sensor element, so that a measuring field present between them changes. For this purpose, the movable sensor element is designed, for example, as a lever-like spring plate or a lever-like spring sheet.

Depending upon the embodiment, the actuating element or an actuating tappet or actuating pin of the actuating element can enter into engagement with the movable sensor element through a through-opening in the carrier plate or enter directly into engagement with the movable sensor element. In an advantageous embodiment, several through-openings are arranged in the support plate, which, for example, is a printed circuit board on which the movable sensor element, the fixed sensor element, and the electronics unit of the electronic sensor module can be arranged, each of which through-openings are at a different distance from the axis of rotation of the movable sensor element. It is thereby possible to easily vary the point of engagement of the actuating element in that the actuating element or an actuating tappet or actuating pin of the actuating element is arranged in one of the several through-openings, as a result of which the transmission ratio is also changed. This allows the electronic sensor module to be used in a versatile manner.

In addition, the sensor unit or individual components, such as, for example, the movable sensor element, can be encapsulated or encased, or at least partially encapsulated or encased, by means of a flexible material such as, for example, a foam material. As a result, the sensor unit or its components can be protected from external environmental influences such as moisture, rain, and dirty water.

In addition, such a flexible material can be provided that the movable sensor element is, additionally, elastically mounted. The flexible material can also perform a connecting, resetting, and sealing function at the same time. For the connecting function, for example, the movable sensor element can be connected to the electronics unit by means of the foam material. Furthermore, the movable sensor element, in particular, the lever, e.g., a spring lever, and/or the flexible material can be designed for a reset function such that it is automatically returned to an initial position or home position after the actuation of the actuating element.

Furthermore, the invention relates to a handle module, in particular, an external handle module for a movable vehicle element of a vehicle, wherein the handle module comprises at least the above-described electronic sensor module and a handle carrier, on or in which the electronic sensor module can be arranged or is arranged. The electronic sensor module can be designed, for example, as a trigger unit for automatically triggering a function, in particular, for triggering an unlocking and an automatic opening of a door lock of the door.

In addition, the invention relates to a movable vehicle element which comprises at least the handle module, as described above, in which the electronic sensor module, as described above, can be arranged or is arranged. The movable vehicle element can be an element which can be opened manually or electrically, in particular, swung open or pushed open, such as a vehicle door, a sliding door, a front hood or engine hood, or a tailgate of a vehicle.

DESCRIPTION OF THE FIGURES

Embodiments of the invention are explained in greater detail with reference to the drawings, in which.

DETAILED DESCRIPTION

Parts corresponding to one another are provided with the same reference signs in all the figures.

Figure 1:
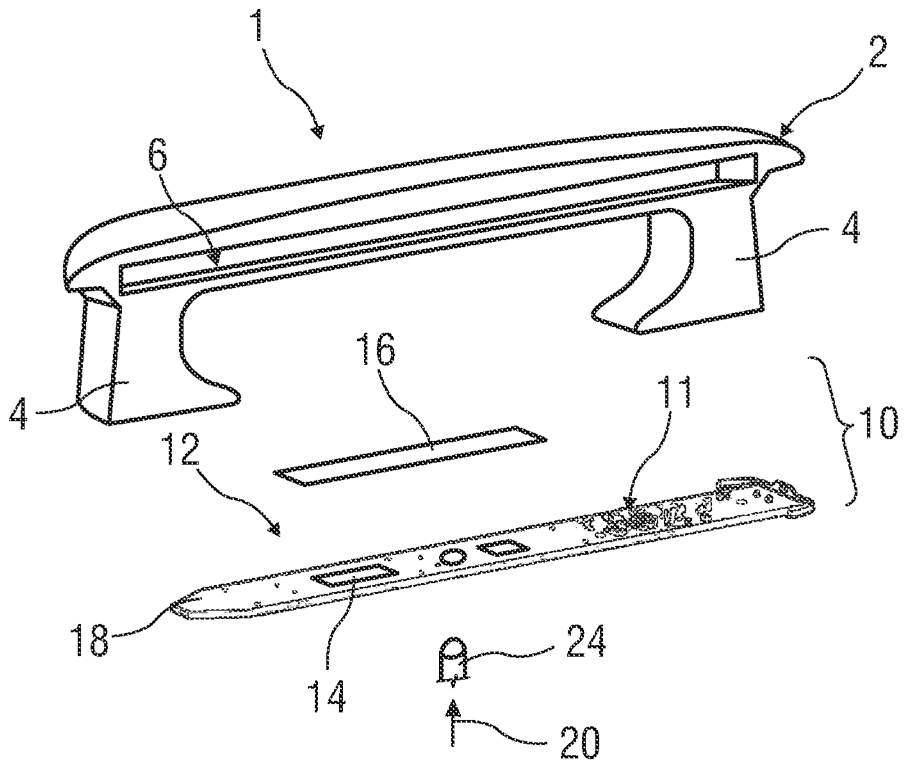
FIG. 1 shows an exploded view of an embodiment of a handle module with an electronic sensor module.

FIG. 1 shows a schematic exploded view of a possible embodiment of a handle module 1 with an electronic sensor module 10.

The handle module 1 can be designed as an external handle module, in particular, an outside door handle module. The handle module 1 can comprise a handle cover 2—for example, a chrome cover or plastic cover. The handle module 1 can comprise a handle support 4, for example, support arms or fastening arms.

The handle module 1 can have a receptacle 6 for the electronic sensor module 10. The electronic sensor module 10 is, for example, pluggable or insertable into the receptacle 6 and is held there, for example in a form-fit and/or force-fit and/or material bond, for example by means of frictional connection, latched, overmolded, and molded in.

In addition, due to the design of the handle module 1 with the internal electronic sensor unit 12, an electric door lock can be reliably triggered by pressure actuation, wherein the internal electronic components of the electronic sensor unit 12 are arranged in a protected manner. For this purpose, the electronic sensor unit 12 is protected, for example, by encapsulation, in particular, additionally, by means of a potting material.

The electronic sensor module 10 comprises at least one electronics unit 11 and a sensor unit 12 having a fixed sensor element 14 and a movable sensor element 16.

The movable sensor element 16 is spaced apart from and arranged opposite the fixed sensor element 14. The electronics unit 11 is connected to the sensor elements 14, 16 for triggering a switching signal. The electronics unit 11 comprises, for example, a printed circuit board 18 (also referred to as a support plate or circuit board).

The fixed sensor element 14 is designed, for example, as a metal layer, in particular, a copper layer, on the printed circuit board 18.

Figure 2:
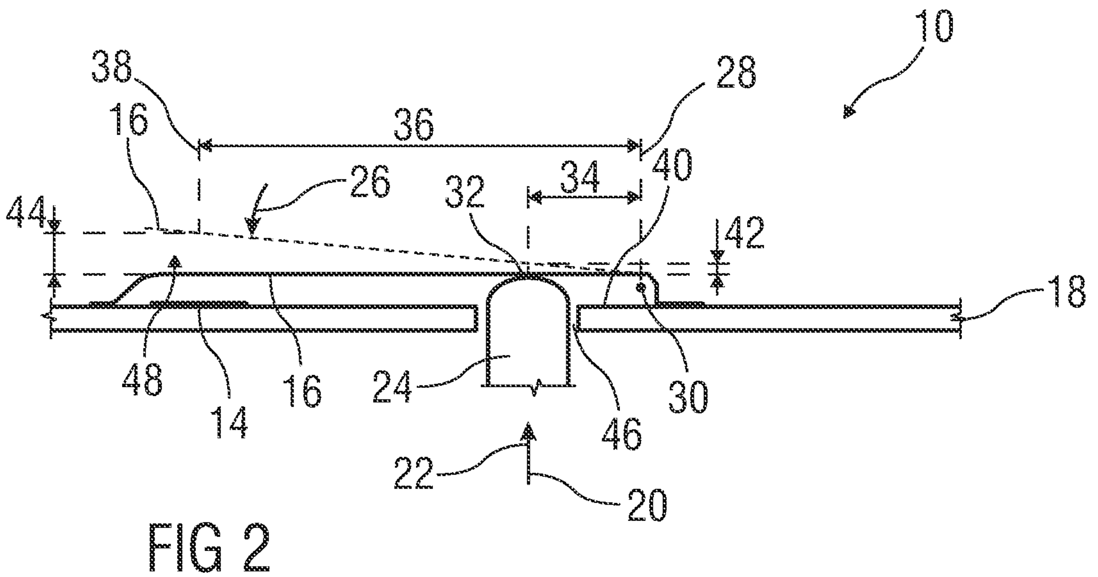
FIG. 2 shows a schematic side view of a cutout of the electronic sensor module in the region of a sensor unit and an actuating element.

In addition, the movable sensor element 16 can be at least partially encapsulated by means of a foam material (not shown in detail) and can be designed as an integrated component with the fixed sensor element 14 and the printed circuit board 18, as shown in FIG. 2. In this assembled state, the electronic sensor module 10 can be designed in the form of a pre-assembly unit and mounted in the handle module 1. The sensor elements 14 and 16 can also be designed as separate integrated components or as a common integrated component and form at least one further pre-assembly partial unit.

The movable sensor element 16 and the fixed sensor element 14 are preferably arranged relative to one another such that, in the event of an actuating force 20 of an actuating element 24 acting upon the sensor module 10, in particular, upon the sensor unit 12, the movable sensor element 16 can be displaced relative to the fixed sensor element 14, depending upon the transmission ratio.

FIG. 2 shows an enlarged cutout of the electronic sensor module 10 in an assembled version and its function.

For example, an actuating movement 22 of an actuating element 24 resulting from the actuating force 20 can be translated into a sensor movement 26 of the movable sensor element 16 in a predetermined transmission ratio. For example, a predetermined transmission ratio of actuating movement 22 to sensor movement 26 of 1:4 or 1:2 can be set.

In order to set the transmission ratio, the movable sensor element 16 can be designed as a lever, in particular, a one-sided lever or a two-sided lever. The movable sensor element 16 designed as a lever has an axis of rotation 30 at a first end point 28.

The actuating element 24 engages in a point of engagement 32 on the movable sensor element 16 for actuation thereof. The actuating force 20 preferably engages, perpendicular to the lever, with the movable sensor element 16. The transmission ratio is determined by a first lever arm 34 which extends between the point of engagement 32 and the axis of rotation 30 of the movable sensor element 16, and a second lever arm 36 which extends between the one second end point 38 and the axis of rotation 30.

In particular, the movable sensor element 16 can be arranged at a predetermined angle 40 to the fixed sensor element 14. For example, the movable sensor element 16 is arranged and held at such an angle 40 to the fixed sensor element 14 that a transmission ratio of the actuating movement 22 of the actuating element 24 to the sensor movement 26 (also the actuating movement) of the movable sensor element 16 of 1:4 or 1:2 is set. This allows for a compact design of the handle module 10 and small actuation strokes. In addition, the actuation forces 20 can be set; in particular, threshold values can be specified.

For example, the movable sensor element 16 can, on the one hand, be pivotably articulated to the printed circuit board 18. On the other hand, a free lever end, in particular, the second end point 38, of the movable sensor element 16 is arranged with a predetermined slope at a distance from the fixed sensor element 14 and covering it. The predetermined slope corresponds to the predetermined angle 40 of the movable sensor element 16 to the fixed sensor element 14.

The actuating element 24 is in particular arranged such that, and interacts with the movable sensor element 16 such that, a predetermined actuating path 42 of the actuating element 24 can be converted into a sensor path 44 of the movable sensor element 16, in particular, with the predetermined transmission ratio. For example, such a transmission ratio can be set that a short actuating path 42 is converted into a long sensor path 44. A safe sensor detection is thereby made possible, and the sensor sensitivity is increased in a simple manner.

In addition, the sensor unit 12 and/or the sensor unit module 10 can be at least partially surrounded by a potting material. This means that the sensor unit 12 and/or the sensor module 10 itself is or are protected from external influences such as moisture, mechanical stress, dirt, water, and rain.

The sensor unit 12 can be designed in particular as a force sensor, in particular a force-controlled capacitive or inductive sensor, for performing a switching function, such as, for example, unlocking a door lock and opening a door. In particular, the sensor unit 12 is designed as a so-called MOC module (=metal-over-cap module), in which the metallic sensor elements 14, 16 located on the inside are encapsulated from the outside.

The movable sensor element 16 can be designed as an elastic trigger element. This allows, in a simple manner, for a manually force-controlled pressure switch having a resetting function. In addition, the movable sensor element can be interposed as an electronic sensor element 16, in particular, a capacitive sensor electrode. As a result, the movable sensor element 16 can also be used to detect an approach of an object and thus serve as an approach sensor.

For example, the actuating element 24, e.g., an actuating tappet or actuating pin, can come into engagement or into further engagement with the movable sensor element 16 when it is actuated in the region of the articulation thereof and move the movable sensor element 16 away from the fixed sensor element 14 (as shown) or towards the fixed sensor element 14 (not shown).

The actuating element 24 can be designed as a pressure transmission element or comprise such an element, which protrudes in the direction of the sensor unit 12. For example, the actuating element 24 comprises a pressure pin directed in the direction of the sensor element 12, in particular, in the direction of the movable sensor element 16, such as a bolt or pin, which can be moved in the pressure direction that corresponds to the actuation direction to actuate the movable sensor element 16.

For example, the actuating element 24 can be actuated such that it can be moved in the direction of pressure through a through-opening 46 in the printed circuit board 18 up to the movable sensor element 16, such as a trigger element for example. As a result, this movable sensor element 16 moves away from the fixed sensor element 14 (as shown) or in the direction of the fixed sensor element 14 (not shown) upon further pressure actuation.

This reduces or increases the distance between the movable sensor element 16, e.g., a trigger element, and the fixed sensor element 14, so that a measuring field 48 present between them changes. For this purpose, the movable sensor element 16 is designed, for example, as a spring plate or a spring sheet.

LIST OF REFERENCE SIGNS

1 Handle module
2 Handle cover
4 Handle support
6 Receptacle
10 Electronic sensor module
11 Electronics unit
12 Sensor unit
14 Fixed sensor element
16 Movable sensor element
18 Printed circuit board
20 Actuating force
22 Actuating movement
24 Actuating element
26 Sensor movement
28 First end point of the movable sensor element
30 Axis of rotation
32 Point of engagement
34 First lever arm
36 Second lever arm
38 Second end point of the movable sensor element
40 Angle
42 Actuating path
44 Sensor path
46 Through-opening
48 Measuring field

The invention claimed is:

1. An electronic sensor module for a handle, comprising:

a sensor unit having a movable sensor element and a fixed sensor element which is arranged opposite the movable sensor element, and an electronics unit which is electrically connected to at least one of the sensor elements for triggering a switching signal, wherein the movable sensor element and the fixed sensor element are arranged relative to one another such that, in the event of an actuating force acting upon the sensor module, the movable sensor element is displaceable relative to the fixed sensor element, and wherein an actuating element is provided which is arranged such that it transmits the actuating force directly to the movable sensor element so that an actuating path of the actuating element is convertible into a sensor path of the movable sensor element, and wherein the actuating element is adapted to make direct contact with the movable sensor element.

2. The electronic sensor module according to claim 1, wherein an actuating movement of an actuating element resulting from the actuating force is translated in a predetermined transmission ratio into a sensor movement of the movable sensor element.

3. The electronic sensor module according to claim 2, wherein the transmission ratio is 1:4 or 1:2.

4. The electronic sensor module according to claim 2, wherein, to adjust the transmission ratio, the movable sensor element is designed as a lever and can be arranged at a predetermined angle to the fixed sensor element.

5. The electronic sensor module according to claim 4, wherein the movable sensor element is on the one hand pivotably articulated to a printed circuit board, and, on the other, a free lever end is arranged with a predetermined slope at a distance from the fixed sensor element and covers it.

6. The electronic sensor module according to claim 5, wherein the actuating element, upon actuation thereof in the region of the articulation or an axis of rotation of the movable sensor element, comes into engagement or further engagement therewith and moves the movable sensor element away from the fixed sensor element or towards the fixed sensor element.

7. The electronic sensor module according to claim 5, wherein the actuating element comes into engagement with the movable sensor element through a through-opening in the printed circuit board.

8. An external handle module for a movable vehicle element of a vehicle, wherein the handle module comprises the electronic sensor module according to claim 1, and a handle support and/or a handle cover, on or in which the electronic sensor module can be arranged.

9. The external handle module according to claim 8, wherein the electronic sensor module is designed as a triggering unit for automatically triggering an unlocking and an automatic opening of a door lock of the door.

10. The electronic sensor module according to claim 1, wherein an upper surface of the actuating element directly contacts a lower surface of the movable sensor element.

11. The electronic sensor module according to claim 1, wherein the movable sensor element comprises a first end portion and a second end portion, wherein the actuation element directly contacts the second end portion.

12. The electronic sensor module according to claim 1, wherein the movable sensor element is a spring plate or spring sheet.

13. An electronic sensor module for a handle, comprising:

a sensor unit having a movable sensor element and a fixed sensor element which is arranged opposite the movable sensor element, and an electronics unit which is electrically connected to at least one of the sensor elements for triggering a switching signal, wherein the movable sensor element and the fixed sensor element are arranged relative to one another such that, in the event of an actuating force acting upon the sensor module, the movable sensor element is displaceable relative to the fixed sensor element, wherein an actuating element is provided which is arranged such that it transmits the actuating force directly to the movable sensor element so that an actuating path of the actuating element is convertible into a sensor path of the movable sensor element, wherein the movable sensor element is on one hand pivotably articulated to a printed circuit board, and wherein the actuating element comes into engagement with the movable sensor element through a through-opening in the printed circuit board.

* * * * *